US012650136B2

(12) United States Patent
Muraoka et al.

(10) Patent No.: US 12,650,136 B2
(45) Date of Patent: Jun. 9, 2026

(54) HYDRAULIC DRIVE DEVICE

(71) Applicant: KAWASAKI JUKOGYO KABUSHIKI KAISHA, Kobe (JP)

(72) Inventors: Hideyasu Muraoka, Kobe (JP); Nobuyuki Kinoshita, Kobe (JP); Yoji Yudate, Kobe (JP); Yoshihiko Hata, Kobe (JP); Yuki Kuwabara, Kobe (JP); Yuichi Miyagi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/876,969

(22) PCT Filed: Apr. 4, 2023

(86) PCT No.: PCT/JP2023/013917

§ 371 (c)(1),
(2) Date: Dec. 19, 2024

(87) PCT Pub. No.: WO2023/248579

PCT Pub. Date: Dec. 28, 2023

(65) Prior Publication Data

US 2025/0382980 A1 Dec. 18, 2025

(30) Foreign Application Priority Data

Jun. 23, 2022 (JP) ................................ 2022-101452

(51) Int. Cl.

| | |
|---|---|
| ***F15B 11/17*** | (2006.01) |
| ***F15B 15/18*** | (2006.01) |
| ***F15B 21/00*** | (2006.01) |

(52) U.S. Cl.

CPC .............. *F15B 15/18* (2013.01); *F15B 11/17* (2013.01); *F15B 21/005* (2013.01); *F15B 2211/30525* (2013.01)

(58) Field of Classification Search

CPC ... F15B 11/0423; F15B 11/163; F15B 11/165; F15B 11/17; F15B 21/14;

(Continued)

(56) References Cited

U.S. PATENT DOCUMENTS 10,519,990 B2 * 12/2019 Owada .................. E02F 9/2235
12,000,112 B2 * 6/2024 Vigholm .............. E02F 9/2217

(Continued)

FOREIGN PATENT DOCUMENTS

JP S57054635 A 4/1982
JP 2010048366 A 3/2010

(Continued)

*Primary Examiner* — Michael Leslie

(74) *Attorney, Agent, or Firm* — Alleman Hall LLP

(57) ABSTRACT

This hydraulic drive device supplies and drains a working fluid to and from a hydraulic cylinder and includes: a plurality of hydraulic pump motors including suction ports and discharge ports; a plurality of electric motors respectively connected to the plurality of hydraulic pump motors; and a directional control valve that is connected to a meter-out passage and connects the hydraulic cylinder to the meter-out passage to drain the working fluid from the hydraulic cylinder to the meter-out passage. The suction ports of the plurality of hydraulic pump motors are connected in parallel with the meter-out passage.

9 Claims, 5 Drawing Sheets

(58) Field of Classification Search
CPC .. F15B 2211/20515; F15B 2211/20546; F15B 2211/255; F15B 2211/3133; F15B 2211/45; E02F 9/2217; E02F 9/2239; E02F 9/2242
See application file for complete search history.

(56) References Cited

U.S. PATENT DOCUMENTS

| | | | | |
|---|---|---|---|---|
| 12,084,839 | B2 * | 9/2024 | Dumnov | F15B 11/165 |
| 2015/0192149 | A1 * | 7/2015 | Ma | F15B 11/17<br>60/484 |
| 2018/0291935 | A1 | 10/2018 | Kondo | |
| 2023/0228063 | A1 | 7/2023 | Kondo et al. | |

FOREIGN PATENT DOCUMENTS

| | | | | |
|---|---|---|---|---|
| JP | 2016217378 A | | 12/2016 | |
| JP | 2021181789 A | | 11/2021 | |
| WO | WO-2023248578 A1 | * | 12/2023 | F15B 11/17 |

* cited by examiner

HYDRAULIC DRIVE DEVICE

TECHNICAL FIELD

The present invention relates to a hydraulic drive device that supplies and drains a working fluid to and from a hydraulic cylinder.

BACKGROUND ART

For example, a hydraulic drive device such as that disclosed in Patent Literature (PTL) 1 is known as a hydraulic drive device that drives a hydraulic cylinder. In the hydraulic drive device such as that disclosed in PTL 1, a hydraulic pump motor is rotatably driven using working oil drained from a head-end port of a boom cylinder in a boom lowering operation. Thus, the potential energy of a boom can be regenerated as electrical energy.

CITATION LIST

Patent Literature

PTL 1: Japanese Laid-Open Patent Application Publication No. 2021-181789

SUMMARY OF INVENTION

Technical Problem

In the hydraulic drive device disclosed in PTL 1, a single hydraulic pump motor is used for the boom cylinder in regeneration of the potential energy of the boom as electrical energy. Therefore, in the hydraulic drive device disclosed in PTL 1, the hydraulic pump motor needs to increase in size to suction, by the single hydraulic pump motor, the entire working fluid drained from the boom cylinder upon regeneration.

Thus, an object of the present invention is to provide a hydraulic drive device capable of performing regeneration and including a hydraulic pump motor reduced in size.

Solution to Problem

A hydraulic drive device according to the first invention supplies and drains a working fluid to and from a hydraulic cylinder and includes: a plurality of hydraulic pump motors including suction ports and discharge ports; a plurality of electric motors respectively connected to the plurality of hydraulic pump motors; and a directional control valve that is connected to a meter-out passage and connects the hydraulic cylinder to the meter-out passage to drain the working fluid from the hydraulic cylinder to the meter-out passage. The suction ports of the plurality of hydraulic pump motors are connected in parallel with the meter-out passage.

According to the first invention, the suction ports of the plurality of hydraulic pump motors are connected in parallel with the meter-out passage. Therefore, the fluid energy of the working fluid drained from the hydraulic cylinder can be regenerated as electrical energy by the plurality of hydraulic pump motors. Accordingly, the flow rate of the working fluid to be suctioned, namely, a suction flow rate, at each of the hydraulic pump motors can be reduced upon regeneration. Thus, the size of each of the hydraulic pump motors can be reduced.

A hydraulic drive device according to the second invention supplies and drains a working fluid to and from a plurality of hydraulic actuators including a first hydraulic actuator that is a hydraulic cylinder and includes: a plurality of hydraulic pump motors including suction ports and discharge ports, the discharge ports being respectively connected to the plurality of hydraulic actuators; a plurality of electric motors respectively connected to the plurality of hydraulic pump motors; and a directional control valve that is connected to a meter-out passage and connects the first hydraulic actuator to the meter-out passage to drain the working fluid from the first hydraulic actuator to the meter-out passage. The suction ports of the plurality of hydraulic pump motors are connected in parallel with the meter-out passage.

According to the second invention, the discharge ports of the hydraulic pump motors are connected to different hydraulic actuators, and thus the plurality of hydraulic actuators can be actuated at the same time. Meanwhile, the suction ports of the hydraulic pump motors are connected in parallel with the meter-out passage. Therefore, the fluid energy of the working fluid drained from the first hydraulic actuator can be regenerated as electrical energy by the plurality of hydraulic pump motors. Accordingly, the flow rate of the working fluid to be suctioned, namely, a suction flow rate, at each of the hydraulic pump motors can be reduced upon regeneration. Thus, the size of each of the hydraulic pump motors can be reduced.

Advantageous Effects of Invention

According to the first and second inventions, regeneration is possible, and the size of the hydraulic pump motor can be reduced.

The above object, other objects, features, and advantages of the present invention will be made clear by the following detailed explanation of preferred embodiments with reference to the attached drawings.

DESCRIPTION OF EMBODIMENTS

Hereinafter, a hydraulic drive device 1 according to an embodiment of the present invention will be described with reference to the aforementioned drawings. Note that the concept of directions mentioned in the following description is used for the sake of explanation; the orientations, etc., of elements according to the invention are not limited to these directions. The hydraulic drive device 1 described below is merely one embodiment of the present invention. Thus, the present invention is not limited to the embodiment and may be subject to addition, deletion, and alteration within the scope of the essence of the invention.

Figure 1:
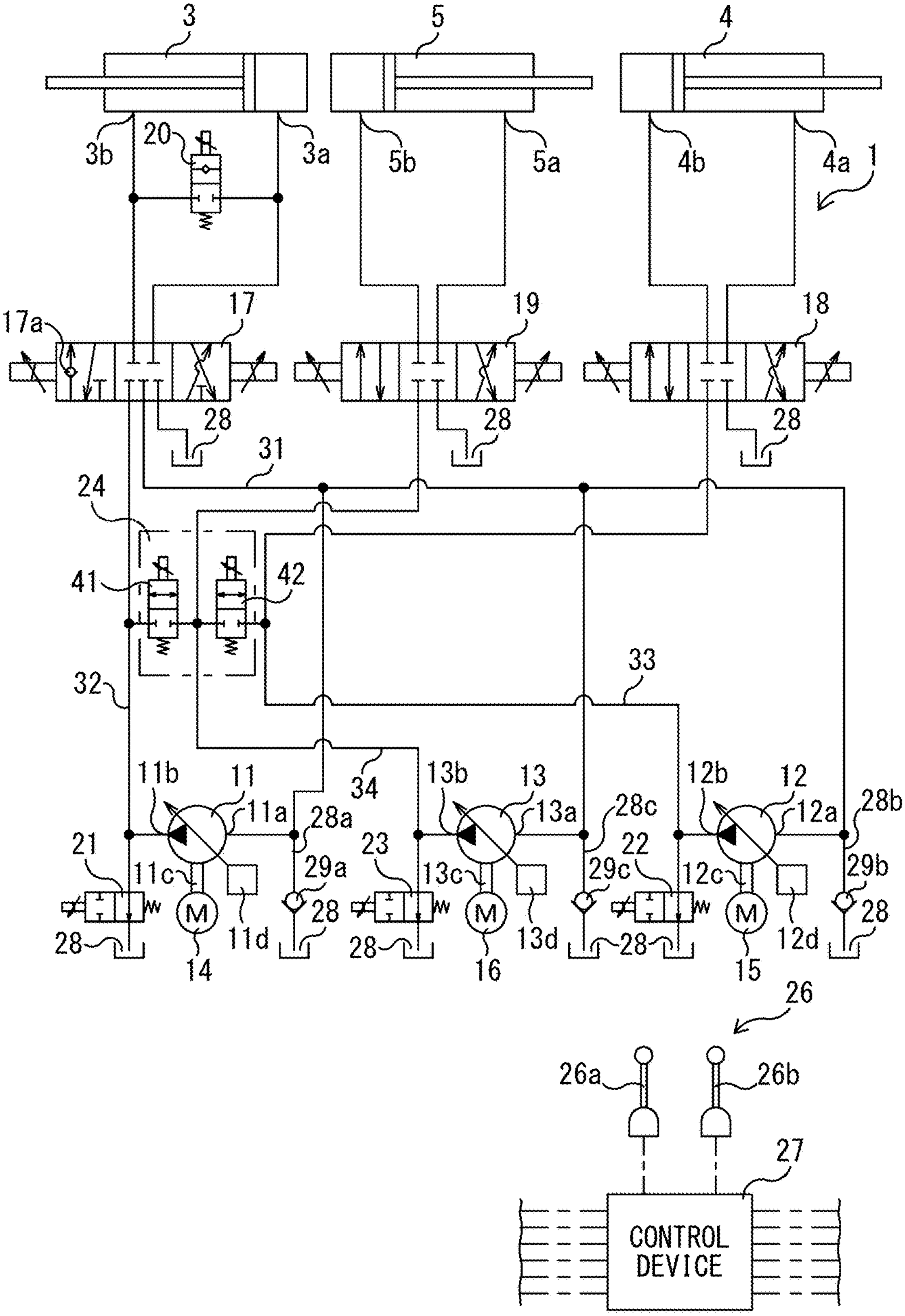
FIG. 1 is a circuit diagram illustrating the configuration of a hydraulic drive device according to the present embodiment.

The hydraulic drive device 1 illustrated in FIG. 1 is included, for example, in a work vehicle (not illustrated in the drawings). Examples of the work vehicle include construction vehicles such as hydraulic excavators and hydraulic cranes and industrial vehicles such as forklifts. In the present embodiment, the work vehicle is a hydraulic excavator. The hydraulic excavator includes a plurality of hydraulic actuators 3 to 5 in order to move an attachment. In the present embodiment, the attachment of the hydraulic excavator is a bucket, and the hydraulic excavator includes at least a boom cylinder 3, which is the first hydraulic actuator, an arm cylinder 4, which is the second hydraulic actuator, and a bucket cylinder 5, which is the third hydraulic actuator. The hydraulic cylinders 3 to 5 are provided on the boom, the arm, and the bucket, respectively. The hydraulic excavator moves the boom, the arm, and the bucket by extending and retracting the three hydraulic cylinders 3 to 5, respectively. Thus, the hydraulic excavator can perform various tasks.

The hydraulic drive device 1 supplies and drains the working fluid to and from the plurality of hydraulic cylinders 3 to 5. In the present embodiment, the hydraulic drive device 1 supplies and drains the working fluid to and from at least the boom cylinder 3, the arm cylinder 4, and the bucket cylinder 5 mentioned above. The hydraulic drive device 1 includes a plurality of hydraulic pump motors 11 to 13, a plurality of electric motors 14 to 16, and a first directional control valve 17. More specifically, the hydraulic drive device 1 includes at least the same number of hydraulic pump motors 11 to 13 and electric motors 14 to 16 as the hydraulic cylinders 3 to 5. In the present embodiment, the hydraulic drive device 1 includes three hydraulic pump motors (namely, first to third hydraulic pump motors) 11 to 13 and three electric motors (namely, first to third electric motors) 14 to 16. The hydraulic drive device 1 further includes a second directional control valve 18, a third directional control valve 19, a recovery valve 20, a plurality of unloader valves 21 to 23, and a merging mechanism 24. In the present embodiment, the hydraulic drive device 1 includes the same number of unloader valves as the hydraulic pump motors 11 to 13, specifically, three unloader valves (namely, first to third unloader valves) 21 to 23. Furthermore, the hydraulic drive device 1 includes an operation device 26 and a control device 27.

[Hydraulic Pump Motor]

The first to third hydraulic pump motors 11 to 13 include suction ports 11*a* to 13*a* and discharge ports 11*b* to 13*b*, respectively. The suction ports 11*a* to 13*a* of the first to third hydraulic pump motors 11 to 13 are connected in parallel with a meter-out passage 31 to be described below. Furthermore, the suction ports 11*a* to 13*a* of the first to third hydraulic pump motors 11 to 13 are connected to a tank 28 via the meter-out passage 31 and tank passages 28*a* to 28*c*. The tank passages 28*a* to 28*c* connect the tank 28 and the meter-out passage 31. Furthermore, check valves 29*a* to 29*c* are provided in the tank passages 28*a* to 28*c*. The check valves 29*a* to 29*c* allow the flow of the working fluid from the tank 28 to the meter-out passage 31 and block the opposite flow of the working fluid.

The discharge ports 11*b* to 13*b* of the first to third hydraulic pump motors 11 to 13 are connected to the hydraulic cylinders 3 to 5, respectively. In the present embodiment, the discharge port 11*b* of the first hydraulic pump motor 11 is connected to the boom cylinder 3. The discharge port 12*b* of the second hydraulic pump motor 12 is connected to the arm cylinder 4. The discharge port 13*b* of the third hydraulic pump motor 13 is connected to the bucket cylinder 5.

Furthermore, the first to third hydraulic pump motors 11 to 13 include shafts 11*c* to 13*c*. When the shafts 11*c* to 13*c* are rotatably driven, the first to third hydraulic pump motors 11 to 13 suction the working fluid from the suction ports 11*a* to 13*a* and discharge the working fluid from the discharge ports 11*b* to 13*b*. On the other hand, when the working fluid is supplied to the suction ports 11*a* to 13*a*, the first to third hydraulic pump motors 11 to 13 cause rotation of the shafts 11*c* to 13*c*.

The first to third hydraulic pump motors 11 to 13 are swash plate pumps of the variable capacity in the present embodiment. This means that the first to third hydraulic pump motors 11 to 13 include regulators 11*d* to 13*d*. The regulators 11*d* to 13*d* change the pump capacity of the first to third hydraulic pump motors 11 to 13 on the basis of first to third capacity commands that are input to the regulators 11*d* to 13*d*.

[Electric Motor]

The first to third electric motors 14 to 16 are connected to the first to third hydraulic pump motors 11 to 13, respectively. More specifically, the first to third electric motors 14 to 16 are connected to the first to third hydraulic pump motors 11 to 13 via the shafts 11*c* to 13*c*, respectively. By rotatably driving the first to third hydraulic pump motors 11 to 13, the first to third electric motors 14 to 16 cause the working fluid to be discharged from the first to third hydraulic pump motors 11 to 13. Furthermore, the first to third electric motors 14 to 16 generate power by being rotatably driven by the first to third hydraulic pump motors 11 to 13. Specifically, the first to third electric motors 14 to 16 work with the first to third hydraulic pump motors 11 to 13 to regenerate the fluid energy of the working fluid as electrical energy. The first to third electric motors 14 to 16 change rotational speeds thereof according to first to third rotational speed commands that are input to the first to third electric motors 14 to 16.

[First Directional Control Valve]

The first directional control valve 17 is connected to the meter-out passage 31. Furthermore, the first directional control valve 17 is connected to the boom cylinder 3. The first directional control valve 17 connects the boom cylinder 3 to the meter-out passage 31 to drain the working fluid from the boom cylinder 3 to the meter-out passage 31. More specifically, the first directional control valve 17 is connected to each of a head-end port 3*a* and a rod-end port 3*b* of the boom cylinder 3. The first directional control valve 17 connects the head-end port 3*a* to the meter-out passage 31. Thus, the working fluid is drained from the head-end port 3*a* of the boom cylinder 3 to the meter-out passage 31. The first to third hydraulic pump motors 11 to 13 (more specifically, the suction ports 11*a* to 13*a*) are connected in parallel with the meter-out passage 31. The first directional control valve 17 is connected to the first hydraulic pump motor 11 via a first pump passage 32. Moreover, the first directional control valve 17 is connected to the tank 28.

The first directional control valve 17 switches the flow direction of the working fluid flowing between the first hydraulic pump motor 11 and the boom cylinder 3 according to a first operation command that is input to the first directional control valve 17. More specifically, according to the first operation command, the first directional control valve 17 switches a destination to which each of the ports 3*a*, 3*b* of the boom cylinder 3 is connected. For example, according to the first operation command, the first directional control valve 17 connects the head-end port 3*a* of the boom cylinder 3 to the meter-out passage 31 and connects the discharge port 11*b* of the first hydraulic pump motor 11 to the rod-end port 3*b* of the boom cylinder 3. In the present embodiment, in the first directional control valve 17, a check valve 17*a* is provided between the discharge port 11*b* and the rod-end port 3*b*. The check valve 17*a* allows the flow of the working fluid from the discharge port 11*b* to the rod-end port 3*b* and blocks the opposite flow of the working fluid. Furthermore, according to the first operation command, the first directional control valve 17 connects the rod-end port 3*b* of the boom cylinder 3 to the tank 28 and connects the discharge port 11*b* of the first hydraulic pump motor 11 to the head-end port 3*a* of the boom cylinder 3. Moreover, the first directional control valve 17 can block the path between the first hydraulic pump motor 11 and the boom cylinder 3.

[Second Directional Control Valve]

The second directional control valve 18 is connected to the second hydraulic pump motor 12 via a second pump passage 33. More specifically, the second directional control valve 18 is connected to the discharge port 12*b* of the second hydraulic pump motor 12. Furthermore, the second directional control valve 18 is also connected to the arm cylinder 4. The second directional control valve 18 switches the flow direction of the working fluid flowing between the second hydraulic pump motor 12 and the arm cylinder 4 according to a second operation command. More specifically, the second directional control valve 18 connects the discharge port 12*b* of the second hydraulic pump motor 12 to one of a rod-end port 4*a* and a head-end port 4*b* of the arm cylinder 4 according to the second operation command. Furthermore, the second directional control valve 18 connects the other of the rod-end port 4*a* and the head-end port 4*b* to the tank 28 according to the second operation command. Thus, the second directional control valve 18 causes the working fluid discharged from the second hydraulic pump motor 12 to flow to one of the rod-end port 4*a* and the head-end port 4*b*. Furthermore, the second directional control valve 18 can block the path between the second hydraulic pump motor 12 and the arm cylinder 4.

[Third Directional Control Valve]

The third directional control valve 19 is connected to the third hydraulic pump motor 13 via a third pump passage 34. More specifically, the third directional control valve 19 is connected to the discharge port 13*b* of the third hydraulic pump motor 13. Furthermore, the third directional control valve 19 is also connected to the bucket cylinder 5. The third directional control valve 19 switches the flow direction of the working fluid flowing between the third hydraulic pump motor 13 and the bucket cylinder 5 according to a third operation command. More specifically, the third directional control valve 19 connects the discharge port 13*b* of the third hydraulic pump motor 13 to one of a rod-end port 5*a* and a head-end port 5*b* of the bucket cylinder 5 according to the third operation command. Furthermore, the third directional control valve 19 connects the other of the rod-end port 5*a* and the head-end port 5*b* to the tank 28 according to the third operation command. Moreover, the third directional control valve 19 can block the path between the third hydraulic pump motor 13 and the bucket cylinder 5.

[Recovery Valve]

The recovery valve 20 is connected to the head-end port 3*a* and the rod-end port 3*b* of the boom cylinder 3. The recovery valve 20 places the head-end port 3*a* and the rod-end port 3*b* in communication according to a recovery command. Furthermore, in the state where the head-end port 3*a* and the rod-end port 3*b* are in communication, the recovery valve 20 allows the flow of the working fluid from the head-end port 3*a* to the rod-end port 3*b* and blocks the opposite flow of the working fluid. Thus, when supplying the working fluid to the rod-end port 3*b*, the recovery valve 20 recovers, to the rod-end port 3*b*, the working fluid drained from the head-end port 3*a*.

[Unloader Valve]

The first to third unloader valves 21 to 23 drain, to the tank 28, at least part of the working fluid discharged from the discharge ports 11*b* to 13*b* of the first to third hydraulic pump motors 11 to 13. More specifically, the first to third unloader valves 21 to 23 are connected to the first to third pump passages 32 to 34, respectively. The first to third unloader valves 21 to 23 are actuated according to the first to third unloading commands that are input thereto. Subsequently, the first to third unloader valves 21 to 23 adjust the opening degrees between the discharge ports 11*b* to 13*b* and the tank 28 according to the first to third unloading commands that are input to the first to third unloader valves 21 to 23.

[Merging Mechanism]

The merging mechanism 24 causes streams of the working fluid discharged from the discharge ports 11*b* to 13*b* of the first to third hydraulic pump motors 11 to 13 to merge together. More specifically, the merging mechanism 24 is connected to each of the three pump passages 32 to 34. The merging mechanism 24 places the first pump passage 32 and the third pump passage 34 in communication, and further places the second pump passage 33 and the third pump passage 34 in communication. Subsequently, the merging mechanism 24 switches the state of communication between the three pump passages 32 to 34 to cause the streams of the working fluid discharged from the first to third hydraulic pump motors 11 to 13 to merge together. In the present embodiment, the merging mechanism 24 includes a first merge valve 41 and a second merge valve 42.

The first merge valve 41 causes the streams of the working fluid discharged from the discharge ports 11*b*, 13*b* of the first and third hydraulic pump motors 11, 13 to merge together. More specifically, the first merge valve 41 is connected to the first pump passage 32 and the third pump passage 34. The first merge valve 41 is opened according to a first merge command that is input thereto. As a result, the first pump passage 32 and the third pump passage 34 are placed in communication, and thus the working fluid can flow back and forth between the two pump passages 32, 34.

The second merge valve 42 causes the streams of the working fluid discharged from the discharge ports 12*b*, 13*b* of the second and third hydraulic pump motors 12, 13 to merge together. More specifically, the second merge valve 42 is connected to the second pump passage 33 and the third pump passage 34. The second merge valve 42 is opened according to a second merge command that is input thereto. As a result, the second pump passage 33 and the third pump passage 34 are placed in communication, and thus the working fluid can flow back and forth between the two pump passages 33, 34.

<Operation Device>

The operation device 26 is operated by a driver or the like in order to move the boom cylinder 3, the arm cylinder 4, and the bucket cylinder 5. More specifically, the operation device 26 outputs an operation signal corresponding to an operation direction and an operation amount (hereinafter referred to as "the operation status") of an operation (hereinafter referred to as "each operation" or "operations") to be performed on each of the hydraulic cylinders 3 to 5. The operation device 26 includes a plurality of operation levers 26*a*, 26*b*, for example. In the present embodiment, the operation device 26 includes two operation levers 26*a*, 26*b*. The operation levers 26*a*, 26*b* can be operated (for example, tilted) in various directions. The operation device 26 outputs an operation signal representing the operation direction (for example, the direction of tilt) and the operation amount (for example, the amount of tilt) of each of the operation levers 26*a*, 26*b* as the operation status of each operation. Note that the operation device 26 may take another form such as an operation panel and may output an operation signal according to an operation performed on the operation panel or the like or a program stored in advance.

<Control Device>

The control device 27 receives the operation signal from the operation device 26. Subsequently, the control device 27 actuates the first to third directional control valves 17 to 19 according to the operation signal that is input to the control device 27. More specifically, the control device 27 actuates the first directional control valve 17 by outputting the first operation command according to the operation status of a first operation that is an operation for the boom cylinder 3. Furthermore, the control device 27 actuates the second directional control valve 18 by outputting the second operation command according to the operation status of a second operation that is an operation for the arm cylinder 4. Moreover, the control device 27 actuates the third directional control valve 19 by outputting the third operation command according to the operation status of a third operation that is an operation for the bucket cylinder 5. The control device 27 outputs the recovery command according to the operation status of the first operation. Thus, the control device 27 actuates the recovery valve 20. Furthermore, the control device 27 outputs first and second communication commands. Thus, the control device 27 opens the first and second merge valves 41, 42.

Figure 2:
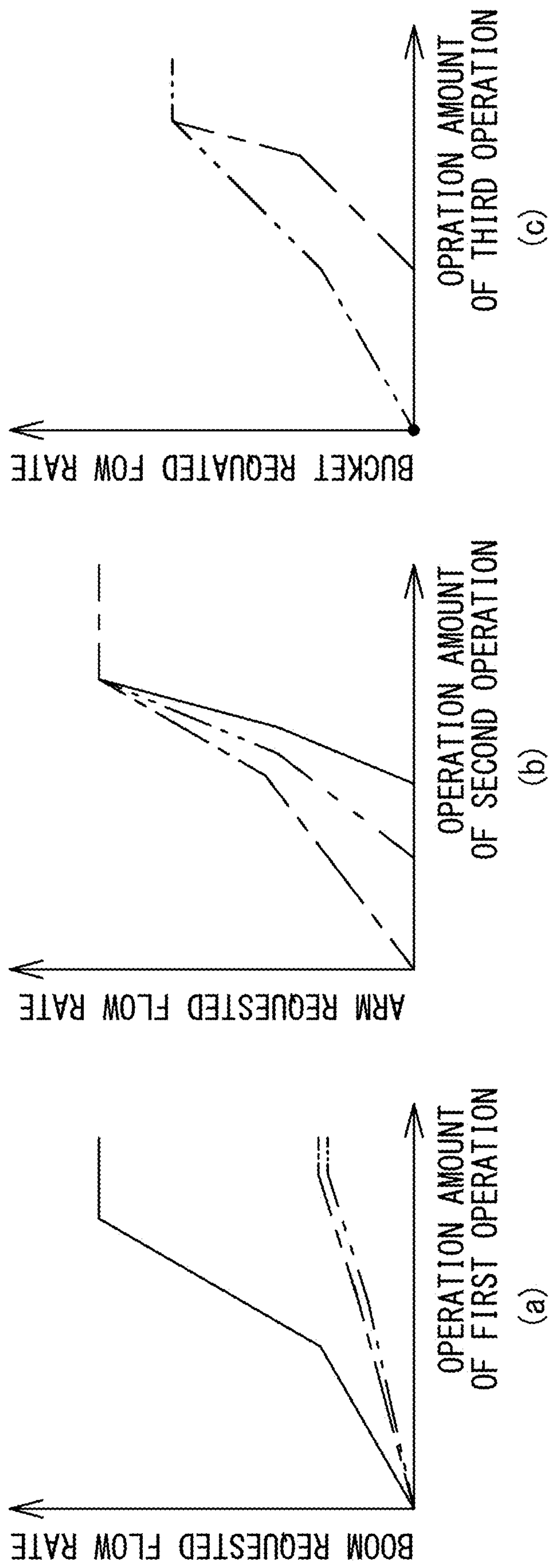
FIG. 2 is graphs showing flow rates at first to third hydraulic pump motors requested by hydraulic cylinders in association with operation amounts of operations in a hydraulic drive device according to the present embodiment, with (a) being a graph showing boom requested flow rates, (b) being a graph showing arm requested flow rates, and (c) being a graph showing bucket requested flow rates.

The control device 27 controls the discharge flow rate or the suction flow rate at each of the first to third hydraulic pump motors 11 to 13 according to the operation signal that is input to the control device 27. More specifically, in the control device 27, the flow rates at the first to third hydraulic pump motors 11 to 13 requested by the hydraulic cylinders 3 to 5 are set in association with the operation amounts of the operations as in the graphs illustrated in (a) to (c) in FIG. 2, for example. For example, boom requested flow rates are shown in (a) in FIG. 2. Arm requested flow rates are shown in (b) in FIG. 2. Bucket requested flow rates are shown in (c) in FIG. 2. Note that the boom requested flow rates are flow rates at the first to third hydraulic pump motors 11 to 13 requested by the boom cylinder 3 in association with the operation amount of the first operation. The arm requested flow rates are flow rates at the first to third hydraulic pump motors 11 to 13 requested by the arm cylinder 4 in association with the operation amount of the second operation. The bucket requested flow rates are flow rates at the second and third hydraulic pump motors 12, 13 requested by the bucket cylinder 5 in association with the operation amount of the third operation. In (a) to (c) in FIG. 2, the solid lines represent the requested flow rates at the first hydraulic pump motor 11, the dot-dashed lines represent the requested flow rates at the second hydraulic pump motor 12, and the dash-dot-dot lines represent the requested flow rates at the third hydraulic pump motor 13.

The control device 27 calculates requested discharge flow rates and requested regeneration flow rates at the first to third hydraulic pump motors 11 to 13 on the basis of the requested flow rates and the operation statuses of the operations. The requested discharge flow rates are discharge flow rates requested to be at the first to third hydraulic pump motors 11 to 13. The requested regeneration flow rates are regeneration flow rates, i.e., suction flow rates, requested to be at the first to third hydraulic pump motors 11 to 13. The method for calculating the requested discharge flow rates and the requested regeneration flow rates will be described in detail below. The control device 27 calculates the rotational speeds of the electric motors 14 to 16 and the pump capacities of the first to third hydraulic pump motors 11 to 13 on the basis of the requested discharge flow rates and the requested regeneration flow rates that have been calculated. Subsequently, the control device 27 outputs, to the electric motors 14 to 16, the first to third rotational speed commands corresponding to the rotational speeds, and outputs, to the first to third hydraulic pump motors 11 to 13, the first to third capacity commands corresponding to the pump capacities. Thus, the control device 27 performs control to set the discharge flow rates at the first to third hydraulic pump motors 11 to 13 to the requested discharge flow rates (or set the suction flow rates to the requested regeneration flow rates) according to the operation statuses of the operations.

The control device 27 controls the operations of the first to third unloader valves 21 to 23 according to the operation signals that are input to the control device 27. More specifically, the control device 27 calculates the requested discharge flow rates and the requested regeneration flow rates at the first to third hydraulic pump motors 11 to 13 as described above. Subsequently, the control device 27 controls the opening degrees of the first to third unloader valves 21 to 23 by outputting the first to third unloading commands corresponding to the differences between the requested discharge flow rates and the requested regeneration flow rates at the first to third hydraulic pump motors 11 to 13.

<Operation of Hydraulic Drive Device>

In the hydraulic drive device 1, when the operation device 26 is operated (in the present embodiment, when the operation levers 26*a*, 26*b* are operated), the operation device 26 outputs an operation signal corresponding to the operation status of each operation. When the operation signal is output, the control device 27 causes the hydraulic cylinders 3 to 5 to be extended and retracted in directions corresponding to the operation direction of each operation and at speeds corresponding to the operation amount of each operation.

More specifically, the control device 27 outputs the rotational speed commands corresponding to the operation status of each operation to the first to third electric motors 14 to 16. Furthermore, the control device 27 outputs the capacity commands corresponding to the operation status of each operation to the first to third hydraulic pump motors 11 to 13. Thus, the control device 27 causes the first to third hydraulic pump motors 11 to 13 to discharge or suction the working fluid at flow rates corresponding to the operation amount of each operation. Moreover, the control device 27 outputs the first to third operation commands corresponding to the operation status of each operation. As a result, the first to third directional control valves 17 to 19 connect the first to third hydraulic pump motors 11 to 13 to the corresponding hydraulic cylinders 3 to 5. Accordingly, the hydraulic cylinders 3 to 5 are extended and retracted in directions corresponding to the operation direction of each operation at speeds corresponding to the operation amount of each operation. The extension and retraction of the hydraulic cylinders 3 to 5 by each operation will be described below with reference to the flow illustrated in FIG. 3.

Figure 3:
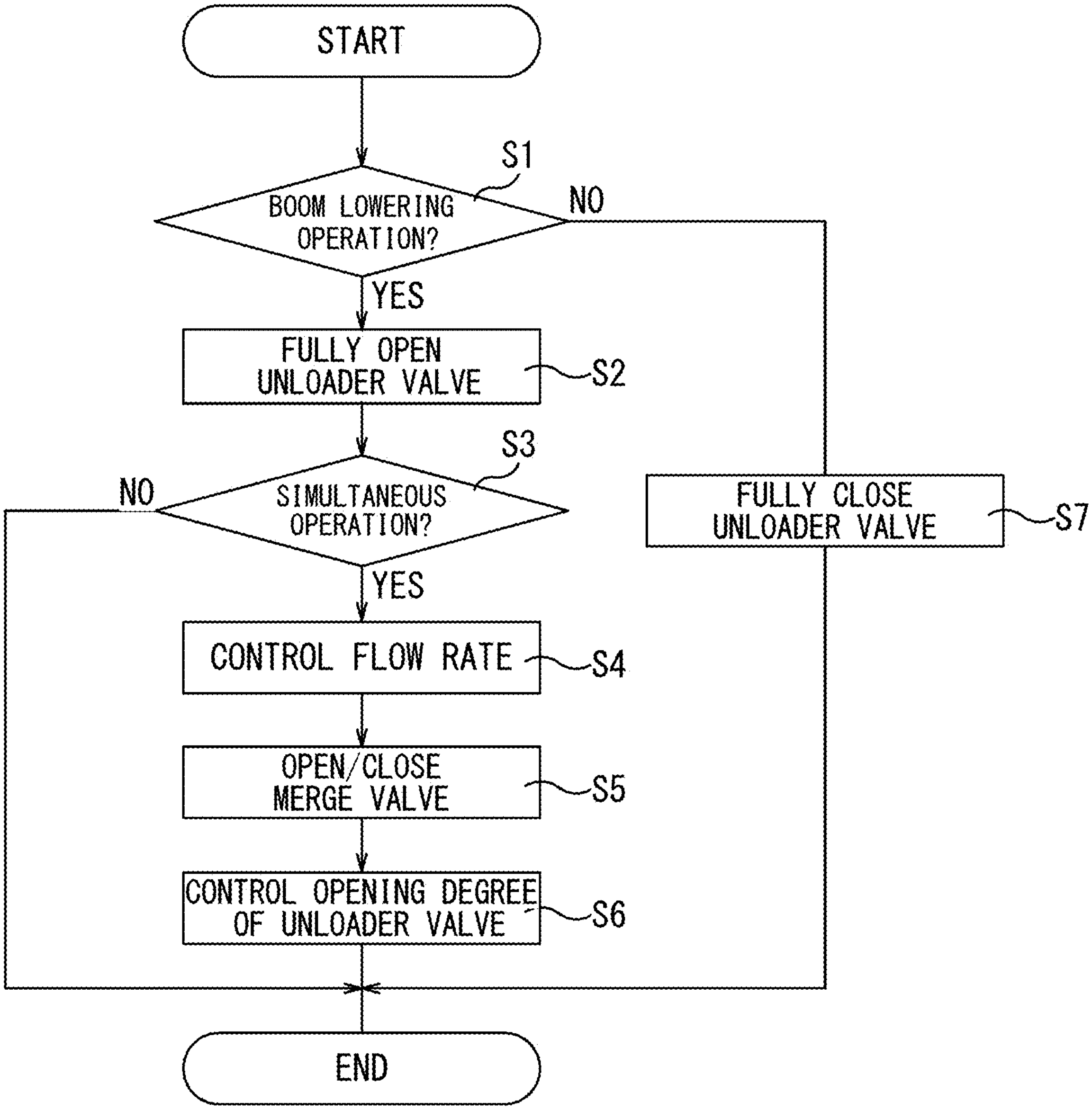
FIG. 3 is a flowchart illustrating the flow of steps to extend and retract each hydraulic cylinder in a hydraulic drive device according to the present embodiment.

When the operation device 26 is operated (in the present embodiment, when the operation levers 26*a*, 26*b* are operated), the control device 27 starts the flow illustrated in FIG. 3. The processing then transitions to Step S1. In Step S1, which is a boom lowering operation determination step, whether a boom lowering operation that is one first operation has been performed is determined. In the present embodiment, the control device 27 determines whether one operation lever 26*a* has been tilted forward in order to lower the boom. When one operation lever 26*a* has been tilted forward, the control device 27 determines that the boom lowering operation has been performed. The processing then transitions to Step S2. On the other hand, when one operation lever 26*a* has not been operated or when one operation lever 26*a* has been tilted backward, the control device 27 determines that the boom lowering operation has not been performed. The processing then transitions to Step S7. Note the boom lowering operation is not limited to the forward tilt of the operation lever 26*a*. This boom lowering operation determination method is merely one example; it is sufficient that when an operation corresponding to the boom lowering operation is performed on the operation device 26, the control device 27 determine that the boom lowering operation has been performed.

In Step S2, which is an unloader valve fully-opening step, the control device 27 fully opens the first to third unloader valves 21 to 23. Subsequently, the control device 27 regenerates, as electrical energy, the fluid energy of the working fluid drained from the head-end port 3*a* of the boom cylinder 3 when lowering the boom; in other words, boom lowering regeneration is performed. The boom lowering regeneration will be described in greater detail below.

The control device 27 actuates the first directional control valve 17 by outputting the first operation command. Accordingly, the first directional control valve 17 connects the head-end port 3*a* of the boom cylinder 3 to the meter-out passage 31. The discharge port 11*b* of the first hydraulic pump motor 11 is connected to the rod-end port 3*b* of the boom cylinder 3 via the check valve 17*a*. Furthermore, the control device 27 calculates the requested regeneration flow rates at the first to third hydraulic pump motors 11 to 13 on the basis of the operation amount of the boom lowering operation. In the present embodiment, the requested regeneration flow rates at the first to third hydraulic pump motors 11 to 13 are calculated according to the boom requested flow rates at the first to third hydraulic pump motors 11 to 13 and the operation amount of the boom lowering operation. Subsequently, the control device 27 outputs the first to third rotational speed commands and the first to third capacity commands that correspond to the requested regeneration flow rates at the first to third hydraulic pump motors 11 to 13. Thus, control is performed such that the suction flow rates at the first to third hydraulic pump motors 11 to 13 are set to the requested regeneration flow rates. Furthermore, the control device 27 sets the opening degrees of the first to third unloader valves 21 to 23 to fully-open opening degrees. As a result, the working fluid flows as follows.

Specifically, the working fluid is drained from the head-end port 3*a* of the boom cylinder 3. The working fluid drained flows from the head-end port 3*a* to the meter-out passage 31. Subsequently, the working fluid is supplied to each of the first to third hydraulic pump motors 11 to 13 via the meter-out passage 31. The first to third hydraulic pump motors 11 to 13 are driven by the working fluid supplied thereto. This causes the first to third electric motors 14 to 16 to generate power. Thus, the fluid energy of the working fluid is regenerated as electrical energy using the first to third hydraulic pump motors 11 to 13 and the first to third electric motors 14 to 16. At this time, the control device 27 keeps the first to third unloader valves 21 to 23 fully open. Therefore, the working fluid discharged from the first to third hydraulic pump motors 11 to 13 is directly drained to the tank 28. This means that the first to third hydraulic pump motors 11 to 13 are in the unloaded state. Therefore, the fluid energy of the working fluid is efficiently regenerated as electrical energy. Furthermore, upon the boom lowering regeneration, the control device 27 outputs the first operation command and also outputs the recovery command. Accordingly, the recovery valve 20 is opened, and thus the rod-end port 3*b* and the head-end port 3*a* are placed in communication. As a result, part of the working fluid drained from the head-end port 3*a* is recovered to the rod-end port 3*b*.

In this manner, in the hydraulic drive device 1, part of the working fluid drained from the head-end port 3*a* of the boom cylinder 3 is recovered to the rod-end port 3*b*, and the remaining part returns to the first to third hydraulic pump motors 11 to 13. As a result, the boom cylinder 3 is retracted, and thus the boom is lowered. Note that the control device 27 performs control to set the suction flow rates of the first to third hydraulic pump motors 11 to 13 to the requested regeneration flow rates, and thus controls the flow rate of the working fluid flowing to the rod-end port 3*b* via the recovery valve 20. This allows the working fluid to flow to the rod-end port 3*b* at a flow rate corresponding to the operation status of the first operation. Thus, the boom cylinder 3 can be retracted at a speed corresponding to the operation status of the first operation. In other words, the boom can be lowered at a speed corresponding to the operation status of the first operation. Furthermore, the amount of power to be generated by the first to third electric motors 14 to 16 is controlled by setting the suction flow rates at the first to third hydraulic pump motors 11 to 13 to the requested regeneration flow rates. When the boom lowering regeneration starts, the processing transitions to Step S3.

In Step S3, which is a simultaneous operation determination step, whether at least one of the second operation and the third operation is being performed along with the boom lowering operation is determined. Mor specifically, the control device 27 obtains the operation status of each operation according to the operation signal that is input thereto. Subsequently, according to the operation status of each operation, the control device 27 determines whether the second operation or the third operation is being performed along with the boom lowering operation. When it is not determined that at least one of the second operation and the third operation is being performed along with the boom lowering operation, the aforementioned boom lowering regeneration continues until the boom lowering operation ends or at least one of the second operation and the third operation is performed along with the boom lowering operation, and the flow ends. On the other hand, when it is determined that at least one of the second operation and the third operation is being performed along with the boom lowering operation, the processing transitions to Step S4.

In Step S4, which is a hydraulic pump motor flow rate control step, the discharge flow rates or the regeneration flow rates of the first to third hydraulic pump motors 11 to 13 are controlled according to the operation status of each operation. More specifically, the control device 27 calculates the requested discharge flow rates and the requested regeneration flow rates at the first to third hydraulic pump motors 11 to 13 on the basis of the requested flow rates and the operation statuses of the operations. In the present embodiment, the requested regeneration flow rates at the first to third hydraulic pump motors 11 to 13 are the boom requested flow rates at the first to third hydraulic pump motors 11 to 13. On the other hand, the requested discharge flow rates at the first to third hydraulic pump motors 11 to 13 are the total of the arm requested flow rates and the bucket requested flow rates at the first to third hydraulic pump motors 11 to 13.

The control device 27 calculates the control flow rates at the first to third hydraulic pump motors 11 to 13. More specifically, the control device 27 selects the greater one of the requested discharge flow rate and the requested regeneration flow rate as the control flow rate. Subsequently, the control device 27 controls the operations of the first to third hydraulic pump motors 11 to 13 and the first to third electric motors 14 to 16 on the basis of the control flow rate. More specifically, the control device 27 outputs the first to third rotational speed commands and the first to third capacity commands according to the control flow rate. Thus, control is performed such that the discharge flow rates or the suction flow rates at the first to third hydraulic pump motors 11 to 13 are set to the control flow rate. For example, the discharge flow rate at one of the first to third hydraulic pump motors 11 to 13 for which the requested discharge flow rate is selected is set to the requested discharge flow rate. On the other hand, the suction flow rate at one of the first to third hydraulic pump motors 11 to 13 for which the requested regeneration flow rate is selected is set to the requested regeneration flow rate. When the discharge flow rate or the regeneration flow rate is controlled, the processing transitions to Step S5.

In Step S5, which is a merging mechanism opening/closing step, the merging mechanism 24 is opened or closed according to each of the requested flow rates. More specifically, the control device 27 opens or closes the first and second merge valves 41, 42 according to the operation status of each operation and the arm requested flow rate and the bucket requested flow rate at the first to third hydraulic pump motors 11 to 13. For example, when the operation amounts of the second and third operations are small, the second and third hydraulic pump motors 12, 13 supply the working fluid to the hydraulic cylinders 4, 5 independently of each other. Therefore, the control device 27 keeps the first and second merge valves 41, 42 closed.

On the other hand, when the operation amount of the second operation increases, the supply of the working fluid from first and third hydraulic pump motors 11, 13 in addition to the second hydraulic pump motor 12 is gradually requested for the arm cylinder 4. First, the control device 27 opens the second merge valve 42 to cause the working fluid from the third hydraulic pump motor 13 to merge with the working fluid from the second hydraulic pump motor 12, and supply the working fluid to the arm cylinder 4. Furthermore, when the flow rate of the working fluid needs to be increased, the control device 27 opens the first merge valve 41 gradually to cause the working fluid from the first hydraulic pump motor 11 to further merge with the working fluid from the second hydraulic pump motor 12, and supply the working fluid to the arm cylinder 4. Moreover, when the operation amount of the third operation increases, the supply of the working fluid from the second hydraulic pump motor 12 in addition to the third hydraulic pump motor 13 is requested for the bucket cylinder 5. Therefore, the control device 27 opens the second merge valve 42. Thus, the working fluid from the second hydraulic pump motor 12 merges with the working fluid from the third hydraulic pump motor 13, and then the working fluid is supplied to the bucket cylinder 5. When the merging mechanism 24 is opened or closed according to the operation amounts of the second and third operations, the processing transitions to Step S6.

In Step S6, which is an unloader valve opening degree control step, the opening degrees of the first to third unloader valves 21 to 23 are controlled according to the differences between the requested discharge flow rates and the requested regeneration flow rates at the first to third hydraulic pump motors 11 to 13. Thus, the flow rates of the working fluid flowing from the first to third hydraulic pump motors 11 to 13 to the hydraulic cylinders 3 to 5 are controlled. In other words, the control device 27 performs an excess flow rate drainage control by the first to third unloader valves 21 to 23. The excess flow rate drainage control will be described in greater detail; the control device 27 calculates the differences between the requested regeneration flow rates and the requested discharge flow rates (for example, the values determined by subtracting the requested discharge flow rates from the requested regeneration flow rates) at the first to third hydraulic pump motors 11 to 13. Subsequently, the control device 27 controls the opening degrees of the first to third unloader valves 21 to 23 according to the differences between the requested discharge flow rates and the requested regeneration flow rates at the first to third hydraulic pump motors 11 to 13.

Specifically, the control device 27 closes the first to third unloader valves 21 to 23 that correspond to the first to third hydraulic pump motors 11 to 13 at each of which the requested discharge flow rate is greater than the requested regeneration flow rate (in other words, the difference is negative). Thus, the entire working fluid flowing at the requested discharge flow rate from each hydraulic pump motor at which the requested discharge flow rate is greater than the requested regeneration flow rate can be used to drive a corresponding one of the hydraulic cylinders 3 to 5. On the other hand, the control device 27 controls the opening degrees of the first to third unloader valves 21 to 23 that correspond to the first to third hydraulic pump motors 11 to 13 at each of which the requested discharge flow rate is less than the requested regeneration flow rate (in other words, the difference is positive). More specifically, the control device 27 controls the opening degrees of the first to third unloader valves 21 to 23 according to the first to third differences. Thus, the control device 27 drains the working fluid from each of the first to third unloader valves 21 to 23 to the tank 28 at an excess flow rate determined by subtracting the requested discharge flow rate from the requested regeneration flow rate at a corresponding one of the first to third hydraulic pump motors 11 to 13. In this manner, the control device 27 supplies the working fluid to each of the hydraulic cylinders 3 to 5 at a required flow rate. When the opening degrees of the first to third unloader valves 21 to 23 are controlled according to the first to third differences, the flow ends.

In Step S7, which is an unloader valve fully-closing step, the control device 27 fully closes the first to third unloader valves 21 to 23. Subsequently, the control device 27 actuates (extends or retracts) the hydraulic cylinders 3 to 5 according to the operation status of each operation. For example, when each operation is performed to actuate the hydraulic cylinders 3 to 5, the control device 27 calculates the requested discharge flow rates at the first to third hydraulic pump motors 11 to 13 on the basis of the requested flow rates and the operation status of each operation. The control device 27 outputs the first to third rotational speed commands and the first to third capacity commands that correspond to the requested discharge flow rates at the first to third hydraulic pump motors 11 to 13. Thus, the working fluid is discharged from the first to third hydraulic pump motors 11 to 13 at flow rates corresponding to the operation amount of each operation. Moreover, the control device 27 outputs the first to third operation commands corresponding to the operation status of each operation. Accordingly, the corresponding first to third directional control valves 17 to 19 are actuated. In the present embodiment, the first to third directional control valve 17 to 19 are fully open when actuated. Therefore, the working fluid flows to the hydraulic cylinders 3 to 5 at flow rates corresponding to the operation amount of each operation. Thus, the hydraulic cylinders 3 to 5 are actuated at speeds according to the operation amount of each operation.

Furthermore, when the operation amount of each operation increases, the control device 27 opens the merging mechanism 24, more specifically, the first and second merge valves 41, 42. When the first merge valve 41 is opened, streams of the working fluid from the first and third hydraulic pump motors 11, 13 merge together. Thus, an increased amount of the working fluid can be supplied, for example, to the bucket cylinder 5. Furthermore, when the second merge valve 42 is opened, streams of the working fluid from the second and third hydraulic pump motors 12, 13 merge together. Thus, an increased amount of the working fluid can be supplied, for example, to the arm cylinder 4. Moreover, when the first and second merge valves 41, 42 are opened, the streams of the working fluid from the first to third hydraulic pump motors 11 to 13 merge together. Thus, a greater amount of the working fluid can be supplied, for example, to the arm cylinder 4. By supplying a great amount of the working fluid in this manner, it is possible to actuate the hydraulic cylinders 3 to 5 at greater speeds according to the operation amount of each operation.

The following describes the operation of the hydraulic drive device 1 performed when an independent boom lowering operation is performed. When the independent boom lowering operation is performed, the control device 27 determines in Step S1 that the boom lowering operation has been performed. Subsequently, in Step S2, the control device 27 fully opens the first to third unloader valves 21 to 23. Furthermore, the control device 27 performs the boom lowering regeneration. Thus, the fluid energy of the working fluid drained from the head-end port 3*a* of the boom cylinder 3 can be regenerated as electrical energy by the first to third hydraulic pump motors 11 to 13 and the first to third electric motors 14 to 16. Because the operation being performed is the independent boom lowering operation, the control device 27 does not determine in Step S3 that at least one of the second operation and the third operation is being performed along with the boom lowering operation. As a result, the flow ends.

Figure 4:
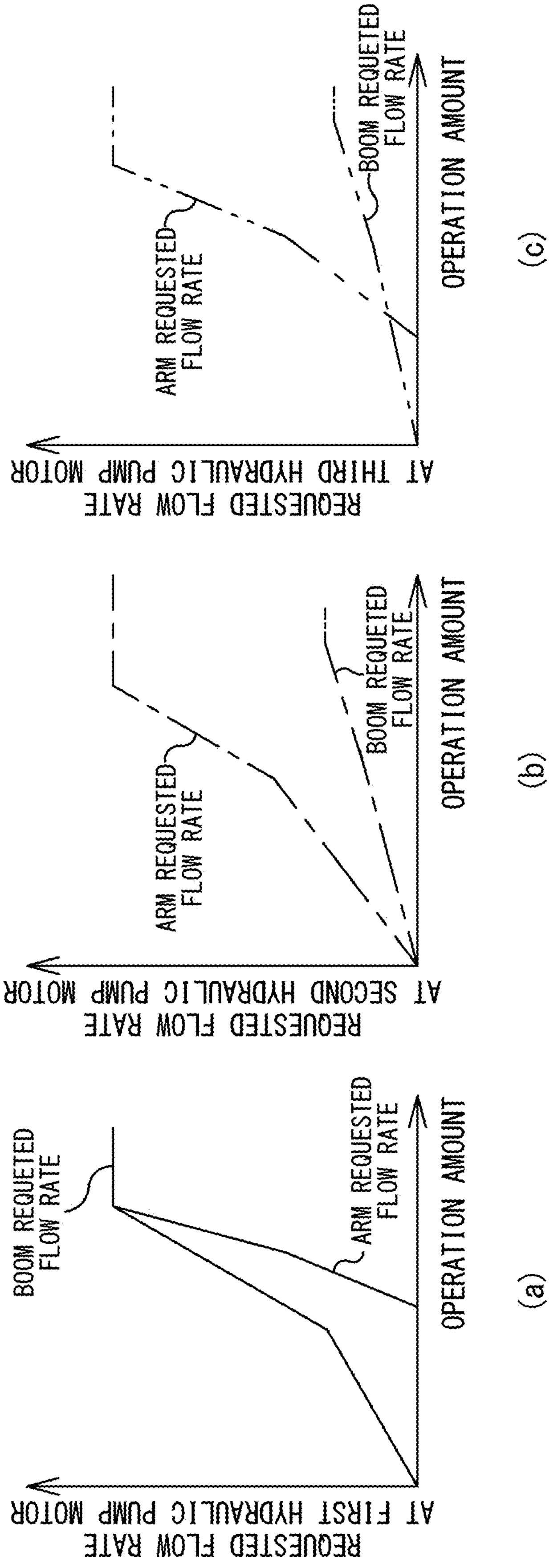
FIG. 4 is graphs showing, in (a) to (c), requested flow rates at first to third hydraulic pump motors in association with operation amounts of operations when a second operation is performed along with a boom lowering operation.

Next, the operation of the hydraulic drive device 1 performed when the second operation is performed along with the boom lowering operation will be described with reference to FIG. 4. FIG. 4 is graphs showing, in (a) to (c), the requested flow rates at the first to third hydraulic pump motors 11 to 13 in association with the operation amounts of the operations when the second operation is performed along with the boom lowering operation. When the second operation is performed along with the boom lowering operation, the control device 27 determines in Step S1 that the boom lowering operation has been performed. Subsequently, in Step S2, the control device 27 fully opens the first to third unloader valves 21 to 23. The control device 27 then performs the boom lowering regeneration. In Step S3, the control device 27 determines that the second operation is being performed along with the boom lowering operation. In Step S4, the control device 27 calculates the control flow rates at the first to third hydraulic pump motors 11 to 13 on the basis of the requested flow rates and the operation amounts of the boom lowering operation and the second operation. In the present embodiment, the requested regeneration flow rate (that is, the boom requested flow rate) is calculated as the control flow rate at the first hydraulic pump motor 11, and the requested discharge flow rate (that is, the arm requested flow rate) is calculated as the control flow rate at the second hydraulic pump motor 12. Meanwhile, when the operation amount of the second operation is small, the requested regeneration flow rate is calculated as the control flow rate at the third hydraulic pump motor 13, and when the operation amount of the second operation increases, the requested discharge flow rate is calculated as the control flow rate at the third hydraulic pump motor 13.

In Step S5, the control device 27 keeps the first and second merge valves 41, 42 closed in the state where the operation amount of the second operation is small. On the other hand, when the operation amount of the second operation increases, the control device 27 opens the second merge valve 42. Thus, the working fluid from the third hydraulic pump motor 13 merges with the working fluid from the second hydraulic pump motor 12. Furthermore, when the operation amount of the second operation further increases, the control device 27 opens the first merge valve 41. Thus, in addition to the working fluid from the third hydraulic pump motor 13, the working fluid from the first hydraulic pump motor 11 also merges with the working fluid from the second hydraulic pump motor 12. When the streams of the working fluid merge together in this manner, it is possible to actuate the arm cylinder 4 at a greater speed.

In Step S6, the control device 27 controls the opening degrees of the first to third unloader valves 21 to 23 according to the first to third differences. For example, at the second hydraulic pump motor 12, the requested discharge flow rate is always greater than the requested regeneration flow rate (in other words, the second difference is negative), and therefore the second unloader valve 22 is fully closed. Meanwhile, the magnitude relationship between the requested discharge flow rate and the requested regeneration flow rate at each of the first and third hydraulic pump motors 11, 13 changes depending on the operation amount of the second operation. When the operation amount of the second operation is small, the requested discharge flow rate is less than the requested regeneration flow rate at each of the first and third hydraulic pump motors 11, 13 (in other words, the first and third differences are positive). Therefore, the control device 27 controls the opening degrees of the first and third unloader valves 21, 23 according to the first and third differences.

For example, when the requested discharge flow rates at the first and third hydraulic pump motors 11, 13 are zero, the first and third unloader valves 21, 23 are fully open. Since the requested discharge flow rates increase as the operation amount of the second operation increases, the control device 27 reduces the opening degrees of the first and third unloader valves 21, 23 according to the first and third differences. Thus, it is possible to increase the flow rate of the working fluid that merges with the working fluid from the second hydraulic pump motor 12 while maintaining the suction flow rates at the first and third hydraulic pump motors 11, 13 at the requested regeneration flow rates. Subsequently, when the operation amount of the second operation further increases and the requested discharge flow rate at each of the first and third hydraulic pump motors 11, 13 exceeds the requested regeneration flow rate, the corresponding one of the first and third unloader valves 21, 23 is closed. When the operation amount of the second operation is reduced, the opening degrees of the first and third unloader valves 21, 23 change from fully-closed opening degrees to fully-open opening degrees according to the first and third differences, following the flow of steps opposite to the aforementioned flow of steps. Subsequently, the flow ends.

Figure 5:
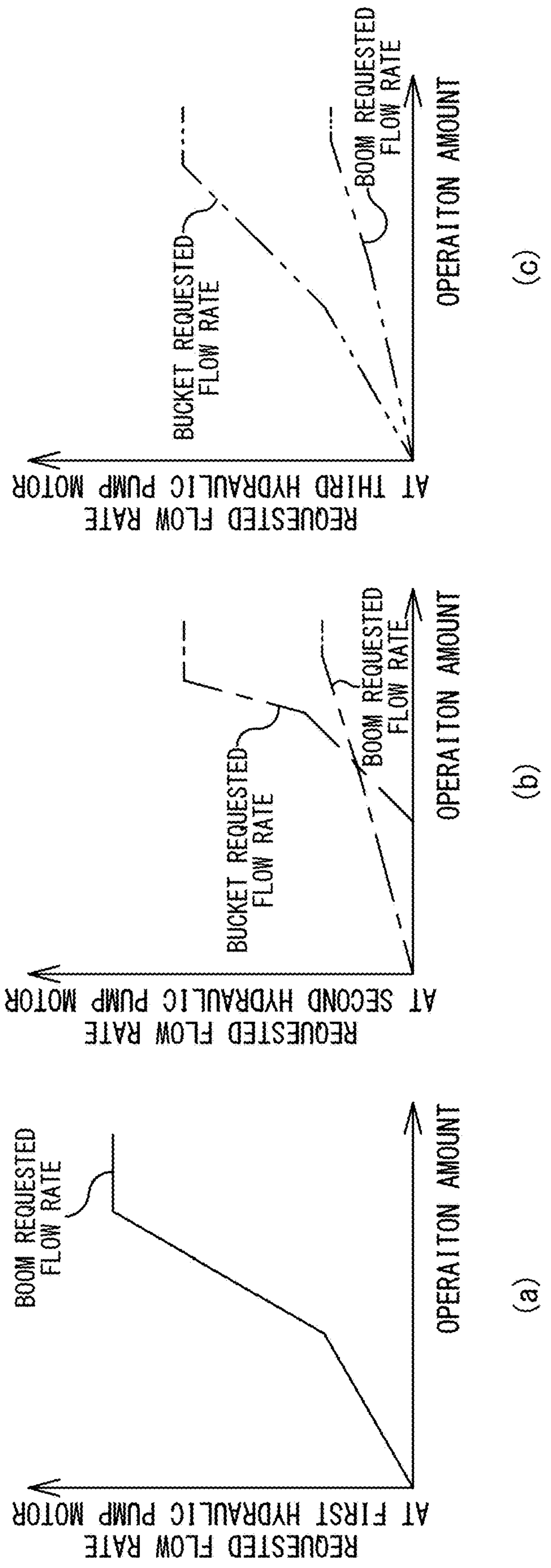
FIG. 5 is graphs showing, in (a) to (c), requested flow rates at first to third hydraulic pump motors in association with operation amounts of operations when a third operation is performed along with a boom lowering operation.

Next, the operation of the hydraulic drive device 1 performed when the third operation is performed along with the boom lowering operation will be described with reference to FIG. 5. FIG. 5 is graphs showing, in (a) to (c), the requested flow rates at the first to third hydraulic pump motors 11 to 13 in association with the operation amounts of the operations when the third operation is performed along with the boom lowering operation. When the third operation is performed along with the boom lowering operation, the control device 27 determines in Step S1 that the boom lowering operation has been performed. Subsequently, in Step S2, the control device 27 fully opens the first to third unloader valves 21 to 23. The control device 27 then performs the boom lowering regeneration. In Step S3, the control device 27 determines that the third operation is being performed along with the boom lowering operation. In Step S4, the control device 27 calculates the control flow rates at the first to third hydraulic pump motors 11 to 13 on the basis of the requested flow rates and the operation amounts of the boom lowering operation and the third operation. In the present embodiment, the requested regeneration flow rate (that is, the boom requested flow rate) is calculated as the control flow rate at the first hydraulic pump motor 11, and the requested discharge flow rate (that is, the bucket requested flow rate) is calculated as the control flow rate at the third hydraulic pump motor 13. Meanwhile, when the operation amount of the third operation is small, the requested regeneration flow rate is calculated as the control flow rate at the second hydraulic pump motor 12, and when the operation amount of the third operation increases, the requested discharge flow rate is calculated as the control flow rate at the second hydraulic pump motor 12.

In Step S5, the control device 27 keeps the first and second merge valves 41, 42 closed in the state where the operation amount of the third operation is small. On the other hand, when the operation amount of the third operation increases, the control device 27 opens the second merge valve 42. Thus, the working fluid from the second hydraulic pump motor 12 merges with the working fluid from the third hydraulic pump motor 13. Accordingly, it is possible to actuate the bucket cylinder 5 at a greater speed.

In Step S6, the control device 27 controls the opening degrees of the second and third unloader valves 22, 23 according to the second and third differences. For example, in the third hydraulic pump motor 13, the requested discharge flow rate is always greater than the requested regeneration flow rate (in other words, the third difference is negative), and therefore the third unloader valve 23 is fully closed. Meanwhile, the magnitude relationship between the requested discharge flow rate and the requested regeneration flow rate at the second hydraulic pump motor 12 changes depending on the operation amount of the third operation. When the operation amount of the third operation is small, the requested discharge flow rate is less than the requested regeneration flow rate at the second hydraulic pump motors 12 (in other words, the second difference is positive). Therefore, the control device 27 performs control to set the opening degree of the second unloader valve 22 to an opening degree corresponding to the second difference.

For example, when the requested discharge flow rate is zero, the second unloader valve 22 is fully open. Since the requested discharge flow rate increases as the operation amount of the third operation increases, the control device 27 reduces the opening degree of the second unloader valve 22 according to the second difference. Thus, it is possible to increase the flow rate of the working fluid that merges with the working fluid from the third hydraulic pump motor 13 while maintaining the suction flow rate at the second hydraulic pump motor 12 at the requested regeneration flow rate. Subsequently, when the operation amount of the third operation further increases and the requested discharge flow rate exceeds the requested regeneration flow rate, the second unloader valve 22 is closed. When the operation amount of the third operation is reduced, the opening degree of the second unloader valve 22 changes from a fully-closed opening degree to a fully-open opening degree according to the second difference, following the flow of steps opposite to the aforementioned flow of steps. Subsequently, the flow ends.

In the hydraulic drive device 1 according to the present embodiment, the suction ports 11*a* to 13*a* of the first to third hydraulic pump motors 11 to 13 are connected in parallel with the meter-out passage 31. Therefore, the fluid energy of the working fluid drained from the boom cylinder 3 can be regenerated as electrical energy by the first to third hydraulic pump motors 11 to 13. Therefore, the suction flow rate at each of the first to third hydraulic pump motors 11 to 13 can be reduced upon regeneration. Thus, the size of each of the first to third hydraulic pump motors 11 to 13 can be reduced.

Furthermore, in the hydraulic drive device 1 according to the present embodiment, the merging mechanism 24 causes the streams of the working fluid discharged from the discharge ports 11*b* to 13*b* of the first to third hydraulic pump motors 11 to 13 to merge together and supplies the working fluid to the hydraulic cylinders 3 to 5. Therefore, the discharge flow rate of the working fluid flowing from each of the first to third hydraulic pump motors 11 to 13 can be reduced. Thus, the size of each of the first to third hydraulic pump motors 11 to 13 can be reduced.

Furthermore, in the hydraulic drive device 1 according to the present embodiment, the opening degree of each of the first to third unloader valves 21 to 23 can be adjusted. Therefore, the flow rate of the remaining part of the working fluid that is not drained to the tank 28 out of the working fluid discharged from the discharge ports 11*b* to 13*b* of the first to third hydraulic pump motors 11 to 13, in other words, the flow rate of the working fluid to be supplied to each of the hydraulic cylinders 4, 5, can be controlled according to the opening degrees of the first to third unloader valves 21 to 23. Thus, the remaining part of the working fluid that is not drained to the tank 28 can be used through accurate control of the flow rate thereof while regeneration is performed at the first to third hydraulic pump motors 11 to 13 upon regeneration. In other words, the working fluid can be supplied from the second and third hydraulic pump motors 12, 13 to the arm cylinder 4 and the bucket cylinder 5 at accurately controlled flow rates.

Furthermore, in the hydraulic drive device 1 according to the present embodiment, the discharge port 11*b* of the first hydraulic pump motor 11 and the discharge port 12*b* of the second hydraulic pump motor 12 are connected to the boom cylinder 3 and the arm cylinder 4, respectively, and thus the boom cylinder 3 and the arm cylinder 4 can be actuated at the same time. Meanwhile, the suction ports 11*a*, 12*a* of the first and second hydraulic pump motors 11, 12 are connected in parallel with the meter-out passage 31. Therefore, the fluid energy of the working fluid drained from the boom cylinder 3 can be regenerated as electrical energy by the first and second hydraulic pump motors 11, 12. Therefore, it is possible to reduce the suction flow rate at each of the first and second hydraulic pump motors 11, 12 during the regeneration operation. Thus, the size of each of the first and second hydraulic pump motors 11, 12 can be reduced.

Furthermore, in the hydraulic drive device 1 according to the present embodiment, the opening degree of the first unloader valve 21 can be adjusted. Therefore, the flow rate of the working fluid discharged from the discharge port 11*b* of the first hydraulic pump motor 11 (in other words, the flow rate of the remaining part that is not drained to the tank 28) can be controlled according to the opening degree of the first unloader valve 21. Thus, the remaining part of the working fluid that is not drained to the tank 28 can be used through accurate control of the flow rate thereof while regeneration is performed at the first and second hydraulic pump motors 11, 12 upon regeneration. For example, by causing the remaining part of the working fluid to merge with the working fluid from the first hydraulic pump motor 11 by the merging mechanism 24, it is possible to use the remaining part of the working fluid to supply the working fluid to the arm cylinder 4, and it is possible to accurately control the flow rate of the working fluid the streams of which merge together.

Furthermore, in the hydraulic drive device 1 according to the present embodiment, the opening degree of the second unloader valve 22 can be adjusted. Thus, regarding the working fluid that is brought from the boom cylinder 3 to the second hydraulic pump motor 12, part of said working fluid can be supplied to the arm cylinder 4, and the fluid energy of the remaining part of said working fluid can be regenerated as electrical energy. Therefore, the working fluid drained from the boom cylinder 3 can be effectively used.

Furthermore, in the hydraulic drive device 1 according to the present embodiment, the merging mechanism 24 causes the streams of the working fluid discharged from the discharge ports 11*b*, 12*b* of the first and second hydraulic pump motors 11, 12 to merge together. Therefore, the discharge flow rate of the working fluid flowing from each of the first and second hydraulic pump motors 11, 12 can be reduced. Thus, the size of each of the first and second hydraulic pump motors 11, 12 can be reduced. Moreover, the flow rate of the working fluid from the first hydraulic pump motor 11 the stream of which is to merge with another stream of the working fluid can be controlled using the first unloader valve 21, and thus the controllability of the arm cylinder 4 can be ensured even when the streams of the working fluid merge together.

Furthermore, in the hydraulic drive device 1 according to the present embodiment, the control device 27 controls the opening degree of the second unloader valve 22 according to the difference between the requested regeneration flow rate and the requested discharge flow rate. Thus, an excess working fluid that is not supplied to the arm cylinder 4 can be regenerated as electrical energy. As a result, the energy consumption in the hydraulic drive device 1 can be reduced.

Furthermore, in the hydraulic drive device 1 according to the present embodiment, the control device 27 controls the opening degree of the first unloader valve 21 according to the first difference, and controls the opening degree of the second unloader valve 22 according to the second difference. Thus, an excess working fluid that is not supplied from the first and second hydraulic pump motors 11, 12 to the arm cylinder 4 can be regenerated as electrical energy. As a result, the energy consumption in the hydraulic drive device 1 can be reduced.

Furthermore, in the hydraulic drive device 1 according to the present embodiment, the control device 27 controls the opening degree of the second unloader valve 22 according to the second difference, and controls the opening degree of the third unloader valve 23 according to the third difference. Thus, an excess working fluid that is not supplied from the second and third hydraulic pump motors 12, 13 to the arm cylinder 4 and the bucket cylinder 5 can be regenerated as electrical energy. As a result, the energy consumption in the hydraulic drive device 1 can be reduced.

Furthermore, in the hydraulic drive device 1 according to the present embodiment, the control device 27 controls the opening degree of the second unloader valve 22 according to the second difference, and controls the opening degree of the third unloader valve 23 according to the third difference. Thus, an excess working fluid that is not supplied from the second and third hydraulic pump motors 12, 13 to the arm cylinder 4 and the bucket cylinder 5 can be regenerated as electrical energy. As a result, the energy consumption in the hydraulic drive device 1 can be reduced. Moreover, the flow rates of the working fluid from the second and third hydraulic pump motors 12, 13 the streams of which are to merge with another stream of the working fluid can be controlled using the second and third unloader valves 22, 23, and thus the controllability of the flow rate of the working fluid the streams of which have merged together can be ensured.

OTHER EMBODIMENTS

The hydraulic drive device 1 according to the present embodiment may be applied to construction vehicles, industrial vehicles, and the like other than hydraulic excavators, and may be applied to other work equipment. The hydraulic drive device 1 may be applied to any vehicles and equipment in which a working fluid is supplied to drive a plurality of hydraulic cylinders. The number of hydraulic cylinders in the hydraulic drive device 1 may be two or may be four or more. Note that when there are two hydraulic cylinders, the number of merge valves is one. The number of hydraulic pump motors to be included in the hydraulic drive device 1 does not necessarily need to be equal to the number of hydraulic actuators. Furthermore, the hydraulic cylinders 3 to 5 are not limited to the boom cylinder 3, the arm cylinder 4, and the bucket cylinder 5 and may be other hydraulic cylinders.

In the hydraulic drive device 1 according to the present embodiment, the first to third hydraulic pump motors 11 to 13 are connected in parallel with the meter-out passage 31, but the number of hydraulic pump motors connected in parallel with the meter-out passage 31 may be two or may be four or more. The second hydraulic actuator to which the second hydraulic pump motor 12 supplies the working fluid may be the bucket cylinder 5. Similarly, the third hydraulic actuator to which the third hydraulic pump motor 13 supplies the working fluid may be the arm cylinder 4. Regarding the extension and retraction of the cylinders, the above-described flow is merely one example and may be another flow. Furthermore, the hydraulic drive device 1 does not necessarily need to include the recovery valve 20 and may include a recovery valve that places the two ports 4*a*, 4*b* of the arm cylinder 4 separately from the recovery valve 20. Moreover, the first to third hydraulic pump motors 11 to 13 may be pumps of the fixed capacity or may be swash plate pumps, gear pumps, and the like. When the first to third hydraulic pump motors 11 to 13 are pumps of the fixed capacity, the control device 27 controls the discharge flow rate and the suction flow rate according to the rotational speeds of the electric motors 14 to 16.

EXEMPLARY EMBODIMENTS

A hydraulic drive device according to the first aspect supplies and drains a working fluid to and from a hydraulic cylinder and includes: a plurality of hydraulic pump motors including suction ports and discharge ports; a plurality of electric motors respectively connected to the plurality of hydraulic pump motors; and a directional control valve that is connected to a meter-out passage and connects the hydraulic cylinder to the meter-out passage to drain the working fluid from the hydraulic cylinder to the meter-out passage. The suction ports of the plurality of hydraulic pump motors are connected in parallel with the meter-out passage.

According to this aspect, the suction ports of the plurality of hydraulic pump motors are connected in parallel with the meter-out passage. Therefore, the fluid energy of the working fluid drained from the hydraulic cylinder can be regenerated as electrical energy by the plurality of hydraulic pump motors. Accordingly, the flow rate of the working fluid to be suctioned, namely, a suction flow rate, at each of the hydraulic pump motors can be reduced upon regeneration. Thus, the size of each of the hydraulic pump motors can be reduced.

A hydraulic drive device according to the second aspect is the hydraulic drive device according to the first aspect that may include a merging mechanism that causes streams of the working fluid discharged from the discharges ports of the plurality of the hydraulic pump motors to merge together and supplies the working fluid to the hydraulic cylinder.

According to this aspect, the merging mechanism causes the streams of the working fluid discharged from the discharge ports of the hydraulic pump motors to merge together and supplies the working fluid to the hydraulic cylinder. Therefore, the discharge flow rate of the working fluid flowing from each of the hydraulic pump motors can be reduced. Thus, the size of each of the hydraulic pump motors can be reduced.

A hydraulic drive device according to the third aspect is the hydraulic drive device according to the first or second aspect that may further include a plurality of unloader valves that drain, to a tank, at least part of the working fluid discharged from the discharge ports of the plurality of hydraulic pump motors. An opening degree of each of the plurality of unloader valves may be adjusted.

According to this aspect, the opening degree of each of the unloader valves can be adjusted. Therefore, the flow rates of the working fluid discharged from the discharge ports of the hydraulic pump motors (in other words, the flow rates of the remaining part of the working fluid that is not drained to the tank) can be controlled according to the opening degrees of the unloader valves. Thus, the remaining part of the working fluid that is not drained to the tank can be used through accurate control of the flow rate thereof while regeneration is performed at the plurality of hydraulic pump motors upon regeneration.

A hydraulic drive device according to the fourth aspect supplies and drains a working fluid to and from a plurality of hydraulic actuators including a first hydraulic actuator that is a hydraulic cylinder and includes: a plurality of hydraulic pump motors including suction ports and discharge ports, the discharge ports being respectively connected to the plurality of hydraulic actuators; a plurality of electric motors respectively connected to the plurality of hydraulic pump motors; and a directional control valve that is connected to a meter-out passage and connects the first hydraulic actuator to the meter-out passage to drain the working fluid from the first hydraulic actuator to the meter-out passage. The suction ports of the plurality of hydraulic pump motors are connected in parallel with the meter-out passage.

According to this aspect, the discharge ports of the hydraulic pump motors are connected to different hydraulic actuators, and thus the plurality of hydraulic actuators can be actuated at the same time. Meanwhile, the suction ports of the hydraulic pump motors are connected in parallel with the meter-out passage. Therefore, the fluid energy of the working fluid drained from the first hydraulic actuator can be regenerated as electrical energy by the plurality of hydraulic pump motors. Accordingly, the flow rate of the working fluid to be suctioned, namely, a suction flow rate, at each of the hydraulic pump motors can be reduced upon regeneration. Thus, the size of each of the hydraulic pump motors can be reduced.

A hydraulic drive device according to the fifth aspect is the hydraulic drive device according to the fourth aspect that may include a first unloader valve. The plurality of hydraulic pump motors may include a first hydraulic pump motor connected to the first hydraulic actuator. The first unloader valve may drain, to a tank, at least part of the working fluid discharged from a discharge port of the first hydraulic pump motor, and an opening degree of the first unloader valve may be adjusted.

According to this aspect, the opening degree of the first unloader valve can be adjusted. Therefore, the flow rate of the working fluid discharged from the discharge port of the first hydraulic pump motor (in other words, the flow rate of the remaining part that is not drained to the tank) can be controlled according to the opening degree of the first unloader valve. Thus, the remaining part of the working fluid that is not drained to the tank can be used through accurate control of the flow rate thereof while regeneration is performed at the plurality of hydraulic pump motors upon regeneration.

A hydraulic drive device according to the sixth aspect is the hydraulic drive device according to the fifth aspect that may include a second unloader valve. The plurality of hydraulic pump motors may include a second hydraulic pump motor that is connected to a second hydraulic actuator that is one of the plurality of hydraulic actuators. The second unloader valve may drain, to the tank, at least part of the working fluid discharged from a discharge port of the second hydraulic pump motor, and an opening degree of the second unloader valve may be adjusted.

According to this aspect, the opening degree of the second unloader valve can be adjusted. Thus, regarding the working fluid that is brought from the first hydraulic actuator to the second hydraulic pump motor, part of said working fluid can be supplied to the second hydraulic actuator, and the fluid energy of the remaining part of said working fluid can be regenerated as electrical energy. Therefore, the working fluid drained from the first hydraulic actuator can be effectively used.

A hydraulic drive device according to the seventh aspect is the hydraulic drive device according to the sixth aspect that may include a merging mechanism. The discharge port of the first hydraulic pump motor may be connected to the first hydraulic actuator. The discharge port of the second hydraulic pump motor may be connected to the second hydraulic actuator. The merging mechanism may cause streams of the working fluid discharged from the discharge port of the first hydraulic pump motor and the discharge port of the second hydraulic pump motor to merge together.

According to this aspect, the merging mechanism can cause the streams of the working fluid discharged from the discharge ports of the first and second hydraulic pump motors to merge together. Therefore, the discharge flow rate at each of the first and second hydraulic pump motors can be reduced. Thus, the size of each of the first and second hydraulic pump motors can be reduced. Moreover, the flow rate of the working fluid from the first hydraulic pump motor the stream of which is to merge with another stream of the working fluid can be controlled using the first unloader valve, and thus the controllability of the second hydraulic actuator can be ensured even when the streams of the working fluid merge together.

A hydraulic drive device according to the eighth aspect is the hydraulic drive device according to the sixth or seventh aspect that may include a control device that controls operations of the directional control valve and the second unloader valve according to a signal that is input to the control device. The control device may actuate the directional control valve according to the signal that is input to the control device to connect the first hydraulic actuator to the meter-out passage, calculate a requested regeneration flow rate, which is a flow rate of the working fluid that is regenerated from the first hydraulic actuator to the second hydraulic pump motor, and a requested discharge flow rate, which is a flow rate of the working fluid that is discharged from the second hydraulic pump motor, on the basis of the signal that is input to the control device, and control an opening degree of the second unloader valve according to a difference between the requested regeneration flow rate and the requested discharge flow rate.

According to this aspect, the control device controls the opening degree of the second unloader valve according to the difference between the requested regeneration flow rate and the requested discharge flow rate. Thus, an excess working fluid that is not supplied to the second hydraulic actuator can be regenerated as electrical energy. As a result, the energy consumption in the hydraulic drive device can be reduced.

A hydraulic drive device according to the ninth aspect is the hydraulic drive device according to the seventh aspect that may include a control device that controls operations of the directional control valve, the merging mechanism, the first unloader valve, and the second unloader valve according to a signal that is input to the control device. When actuating the directional control valve according to the signal that is input to the control device to connect the first hydraulic actuator to the meter-out passage, causing streams of the working fluid discharged from the discharge port of the first hydraulic pump motor and the discharge port of the second hydraulic pump motor to merge together by the merging mechanism, and supplying the working fluid to the second hydraulic actuator, the control device may calculate a requested regeneration flow rate, which is a flow rate of the working fluid that is regenerated from the first hydraulic actuator to each of the first hydraulic pump motor and the second hydraulic pump motor, and a requested discharge flow rate, which is a flow rate of the working fluid that is discharged from each of the first hydraulic pump motor and the second hydraulic pump motor, on the basis of the signal that is input to the control device, control an opening degree of the first unloader valve according to a first difference, which is a difference between the requested regeneration flow rate and the requested discharge flow rate at the first hydraulic pump motor, and control an opening degree of the second unloader valve according to a second difference, which is a difference between the requested regeneration flow rate and the requested discharge flow rate at the second hydraulic pump motor.

According to this aspect, the control device controls the opening degree of the first unloader valve according to the first difference, and controls the opening degree of the second unloader valve according to the second difference. Thus, an excess working fluid that is not supplied from each of the two hydraulic pump motors to the hydraulic actuator can be regenerated as electrical energy. As a result, the energy consumption in the hydraulic drive device can be reduced.

A hydraulic drive device according to the tenth aspect is the hydraulic drive device according to one of the sixth to ninth aspects that may further include: a third unloader valve; and a control device that controls operations of the directional control valve, the second unloader valve, and the third unloader valve according to a signal that is input to the control device. The plurality of hydraulic pump motors may further include a third hydraulic pump motor that is connected to a third hydraulic actuator that is one of the plurality of hydraulic actuators. The third unloader valve may drain, to the tank, at least part of the working fluid discharged from a discharge port of the third hydraulic pump motor, and an opening degree of the third unloader valve may be adjusted. When actuating the directional control valve according to the signal that is input to the control device to connect the first hydraulic actuator to the meter-out passage, the control device may calculate a requested regeneration flow rate, which is a flow rate of the working fluid that is regenerated from the first hydraulic actuator to each of the second hydraulic pump motor and the third hydraulic pump motor, and a requested discharge flow rate, which is a flow rate of the working fluid that is discharged from each of the second hydraulic pump motor and the third hydraulic pump motor, on the basis of the signal that is input to the control device, control an opening degree of the second unloader valve according to a second difference, which is a difference between the requested regeneration flow rate and the requested discharge flow rate at the second hydraulic pump motor, and control an opening degree of the third unloader valve according to a third difference, which is a difference between the requested regeneration flow rate and the requested discharge flow rate at the third hydraulic pump motor.

According to this aspect, the control device controls the opening degree of the second unloader valve according to the second difference, and controls the opening degree of the third unloader valve according to the third difference. Thus, an excess working fluid that is not supplied from each of the two hydraulic pump motors to the second and third hydraulic actuators can be regenerated as electrical energy. As a result, the energy consumption in the hydraulic drive device can be reduced.

A hydraulic drive device according to the eleventh aspect is the hydraulic drive device according to the tenth aspect that may further include a merging mechanism. The merging mechanism may cause streams of the working fluid discharged from the discharge port of the second hydraulic pump motor and the discharge port of the third hydraulic pump motor to merge together, and supply the working fluid to the second hydraulic actuator or the third hydraulic actuator. When actuating the directional control valve according to the signal that is input to the control device to connect the first hydraulic actuator to the meter-out passage and causing streams of the working fluid discharged from the discharge port of the second hydraulic pump motor and the discharge port of the third hydraulic pump motor to merge together by the merging mechanism, the control device may control the opening degree of the second unloader valve according to the second difference, and control the opening degree of the third unloader valve according to the third difference.

According to this aspect, the control device controls the opening degree of the second unloader valve according to the second difference, and controls the opening degree of the third unloader valve according to the third difference. Thus, an excess working fluid that is not supplied from each of the two hydraulic pump motors to the hydraulic actuator can be regenerated as electrical energy. As a result, the energy consumption in the hydraulic drive device can be reduced. Moreover, the flow rate of the working fluid from the second and third hydraulic pump motors the streams of which are to merge with another stream of the working fluid can be controlled using the second and third unloader valves, and thus the controllability of the flow rate of the working fluid the streams of which have merged together can be ensured.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic drive device that supplies and drains a working fluid to and from a hydraulic cylinder, the hydraulic drive device comprising:
- a plurality of hydraulic pump motors including suction ports and discharge ports;
- a plurality of electric motors respectively connected to the plurality of hydraulic pump motors;
- a directional control valve that is connected to a meter-out passage and connects the hydraulic cylinder to the meter-out passage to drain the working fluid from the hydraulic cylinder to the meter-out passage; and
- a plurality of unloader valves that drain, to a tank, at least part of the working fluid discharged from the discharge ports of the plurality of hydraulic pump motors, wherein
- the suction ports of the plurality of hydraulic pump motors are connected in parallel with the meter-out passage, and
- an opening degree of each of the plurality of unloader valves is adjusted.

2. The hydraulic drive device according to claim 1, further comprising:
- a merging mechanism that includes at least one merge valve and causes streams of the working fluid discharged from the discharge ports of the plurality of the hydraulic pump motors to merge together and supplies the working fluid to the hydraulic cylinder.

3. A hydraulic drive device that supplies and drains a working fluid to and from a plurality of hydraulic actuators including a first hydraulic actuator that is a hydraulic cylinder, the hydraulic drive device comprising:
- a plurality of hydraulic pump motors including suction ports and discharge ports, the discharge ports being respectively connected to the plurality of hydraulic actuators;
- a plurality of electric motors respectively connected to the plurality of hydraulic pump motors;
- a directional control valve that is connected to a meter-out passage and connects the first hydraulic actuator to the meter-out passage to drain the working fluid from the first hydraulic actuator to the meter-out passage; and
- a first unloader valve, wherein
- the suction ports of the plurality of hydraulic pump motors are connected in parallel with the meter-out passage,
- the plurality of hydraulic pump motors include a first hydraulic pump motor connected to the first hydraulic actuator, and
- the first unloader valve drains, to a tank, at least part of the working fluid discharged from a discharge port of the first hydraulic pump motor, and an opening degree of the first unloader valve is adjusted.

4. The hydraulic drive device according to claim 3, comprising:
- a second unloader valve, wherein
- the plurality of hydraulic pump motors include a second hydraulic pump motor that is connected to a second hydraulic actuator that is one of the plurality of hydraulic actuators, and
- the second unloader valve drains, to the tank, at least part of the working fluid discharged from a discharge port of the second hydraulic pump motor, and an opening degree of the second unloader valve is adjusted.

5. The hydraulic drive device according to claim 4, comprising:
- a merging mechanism including at least one merge valve, wherein
- the discharge port of the first hydraulic pump motor is connected to the first hydraulic actuator,
- the discharge port of the second hydraulic pump motor is connected to the second hydraulic actuator, and
- the merging mechanism causes streams of the working fluid discharged from the discharge port of the first hydraulic pump motor and the discharge port of the second hydraulic pump motor to merge together.

6. The hydraulic drive device according to claim 4, comprising:
- a control device that controls operations of the directional control valve and the second unloader valve according to a signal that is input to the control device, wherein
- the control device actuates the directional control valve according to the signal that is input to the control device to connect the first hydraulic actuator to the meter-out passage, calculates a requested regeneration flow rate and a requested discharge flow rate on the basis of the signal that is input to the control device, and controls an opening degree of the second unloader valve according to a difference between the requested regeneration flow rate and the requested discharge flow rate, the requested regeneration flow rate being a flow rate of the working fluid that is regenerated from the first hydraulic actuator to the second hydraulic pump motor, the requested discharge flow rate being a flow rate of the working fluid that is discharged from the second hydraulic pump motor.

7. The hydraulic drive device according to claim 5, comprising:

a control device that controls operations of the directional control valve, the merging mechanism, the first unloader valve, and the second unloader valve according to a signal that is input to the control device, wherein when actuating the directional control valve according to the signal that is input to the control device to connect the first hydraulic actuator to the meter-out passage, causing streams of the working fluid discharged from the discharge port of the first hydraulic pump motor and the discharge port of the second hydraulic pump motor to merge together by the merging mechanism, and supplying the working fluid to the second hydraulic actuator, the control device calculates a requested regeneration flow rate and a requested discharge flow rate on the basis of the signal that is input to the control device, controls an opening degree of the first unloader valve according to a first difference, and controls an opening degree of the second unloader valve according to a second difference, the requested regeneration flow rate being a flow rate of the working fluid that is regenerated from the first hydraulic actuator to each of the first hydraulic pump motor and the second hydraulic pump motor, the requested discharge flow rate being a flow rate of the working fluid that is discharged from each of the first hydraulic pump motor and the second hydraulic pump motor, the first difference being a difference between the requested regeneration flow rate and the requested discharge flow rate at the first hydraulic pump motor, the second difference being a difference between the requested regeneration flow rate and the requested discharge flow rate at the second hydraulic pump motor.

8. The hydraulic drive device according to claim 4, further comprising:

a third unloader valve; and a control device that controls operations of the directional control valve, the second unloader valve, and the third unloader valve according to a signal that is input to the control device, wherein the plurality of hydraulic pump motors further include a third hydraulic pump motor that is connected to a third hydraulic actuator that is one of the plurality of hydraulic actuators, the third unloader valve drains, to the tank, at least part of the working fluid discharged from a discharge port of the third hydraulic pump motor, and an opening degree of the third unloader valve is adjusted, and when actuating the directional control valve according to the signal that is input to the control device to connect the first hydraulic actuator to the meter-out passage, the control device calculates a requested regeneration flow rate and a requested discharge flow rate on the basis of the signal that is input to the control device, controls an opening degree of the second unloader valve according to a second difference, and controls an opening degree of the third unloader valve according to a third difference, the requested regeneration flow rate being a flow rate of the working fluid that is regenerated from the first hydraulic actuator to each of the second hydraulic pump motor and the third hydraulic pump motor, the requested discharge flow rate being a flow rate of the working fluid that is discharged from each of the second hydraulic pump motor and the third hydraulic pump motor, the second difference being a difference between the requested regeneration flow rate and the requested discharge flow rate at the second hydraulic pump motor, the third difference being a difference between the requested regeneration flow rate and the requested discharge flow rate at the third hydraulic pump motor.

9. The hydraulic drive device according to claim 8, further comprising:

a merging mechanism including at least one merge valve, wherein the merging mechanism causes streams of the working fluid discharged from the discharge port of the second hydraulic pump motor and the discharge port of the third hydraulic pump motor to merge together, and supplies the working fluid to the second hydraulic actuator or the third hydraulic actuator, and when actuating the directional control valve according to the signal that is input to the control device to connect the first hydraulic actuator to the meter-out passage and causing streams of the working fluid discharged from the discharge port of the second hydraulic pump motor and the discharge port of the third hydraulic pump motor to merge together by the merging mechanism, the control device controls the opening degree of the second unloader valve according to the second difference, and controls the opening degree of the third unloader valve according to the third difference.

* * * * *